(12) United States Patent
Peters

(10) Patent No.: US 8,095,858 B2
(45) Date of Patent: Jan. 10, 2012

(54) FILE ERROR IDENTIFICATION, REPORTING, AND REPLACEMENT OF MEDIA FILES

(75) Inventor: Mark E. Peters, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 1008 days.

(21) Appl. No.: 12/027,344

(22) Filed: Feb. 7, 2008

(65) Prior Publication Data

US 2009/0204855 A1 Aug. 13, 2009

(51) Int. Cl.
*G06F 11/00* (2006.01)
(52) U.S. Cl. .......................................... 714/798; 714/54
(58) Field of Classification Search .................. 714/6.12, 714/42, 48, 54, 746, 798, 799; 360/131
See application file for complete search history.

(56) References Cited

U.S. PATENT DOCUMENTS 7,827,440 B1 * 11/2010 Dudte et al. .................. 714/6.12
2008/0256640 A1 * 10/2008 Tobita et al. .................... 726/26
* cited by examiner

*Primary Examiner* — Shelly A Chase
(74) *Attorney, Agent, or Firm* — Patents on Demand, P.A.; Brian K. Buchheit; Scott M. Garrett

(57) ABSTRACT

The present invention discloses a solution for automatically replacing a media files upon a device able to identify problems with locally stored media files. Initially, an automated process or user of a media playing device can initially identify a media file, which the media playing device is unable to play. The media playing device can be connected to an external device associated with a media store including a set of source media files. The source media files of the media store can be automatically queried for a corresponding one of the detected media file. A copy of a source media file resulting from the query can be automatically conveyed from the media store to the media playing device.

20 Claims, 2 Drawing Sheets

FILE ERROR IDENTIFICATION, REPORTING, AND REPLACEMENT OF MEDIA FILES

BACKGROUND

1. Field of the Invention

The present invention relates to the field of digital media handling, and, more particularly, to file error identification, reporting, and replacement of problematic media files.

2. Description of the Related Art

On-demand media services are becoming popular as a result of inexpensive portable media devices such as portable MP3 players, portable video players, and even mobile phones with multimedia capabilities. Many of these media services deliver media files to subscribers, sometimes for a fee. To garner the most market share, media services often offer digitally encoded files for several different portable media devices, each with its own device specific encoding, digital rights management (DRM) restrictions, fidelity, and the like. When the provider supplies the media files for different devices, transmission problems can occur, which result in a delivery of a corrupt media file. In addition, media files can be delivered in a format, which the receiving media device is unable to play due to incompatible encoding schemes, DRM key and/or codec revocations, and/or DRM restrictions.

As an example of DRM key and/or codec revocations, REALNETWORKS will revoke keys or encoding types when there is evidence that either has been compromised. The media players connect to a centralized media source occasionally to obtain a list of revoked codecs. The player may only detect that parts of the media are not playing.

In these situations, the user often must detect a problem, delete the problematic file, and replace this file with a different copy provided by a content source, which is compatible with the media player. This can prove to be cumbersome for users who maintain a large collection of music. One further frustration can occur when a content source charges a recipient for a new file, which replaces the problematic file. This can aggravate a customer to an extent that he/she may choose to use an alternative service in the future. Additionally, the source media file itself may be corrupted, which causes the replacement file to have the same inherent problems as the original file.

To illustrate using one specific example, many subscription services exist (e.g., RHAPSODY) that permit unlimited music consumption for a period of time based upon subscription details. Presently, no convenient and/or efficient mechanisms exist for users of the subscription services to report problematic or corrupt content. For example, many subscription services permit email based reporting of corrupt files. These emails are manually processed/handled, which results in days or weeks of delay before content reported as corrupt is fixed. Knowing this latency, users are discouraged from reporting errors since an expected response time is often too late to satisfy their relatively immediate desires for music.

SUMMARY OF THE INVENTION

The present invention can be implemented in accordance with numerous aspects consistent with material presented herein. For example, one aspect of the present invention can include a method for automatically replacing a media file. Initially, an automated process or user of a media playing device can initially identify a media file, which the media playing device is unable to play. The media playing device can be connected to an external device associated with a media store including a set of source media files. The source media files of the media store can be automatically queried for a corresponding one of the detected media file. A copy of a source media file resulting from the querying step can be automatically conveyed from the media store to the media playing device.

Another aspect of the present invention can include a system for identifying (either through user reporting or through error detection software) problematic media files that includes a first and second media store, a media diagnostic engine, and a media replacement engine. The first and second media stores are data stores that each includes a set of digitally encoded media files. The media diagnostic engine and the media replacement engines are both software engines. The media diagnostic engine can determine, based upon a software process or a user input, whether problems exist within one of the media files located in the first media store. A media file determined to have a problem can be referred to as a problematic file. The media replacement engine can determine one of the source file files (referred to as a replacement file) that corresponds to the problematic file. The media replacement engine can also be configured to acquire the replacement file from the second media store and to convey a copy of the replacement file to the first media store. The programmatic actions performed by the media replacement engine can occur automatically without requiring explicit interactions by a user associated with the first media store.

Still another aspect of the present invention can a media playing device that includes a media store, media playing components, a communication port, and a set of executable programmatic instructions. The media store can store a set of digitally encoded local media files, such as music and video files. The media playing components can allow the media playing device to play the digitally encoded local media files responsive to a user selection. The port can permit the media playing device to exchange data with external computing devices. The programmatic instructions can detect whether problems exist within one of the local media files, referred to as a problematic files. Each problematic file can be unable to be properly played by the media playing device. The programmatic instructions can also detect when the port connects the media playing device to a content source. The content source can include a set of source media files. When the media playing device is connected to the content source via the port, the media playing device can automatically request a replacement file for any detected programmatic files. The media playing device can be configured to receive a replacement file via the port and to automatically replace the corresponding problematic file with the replacement file.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
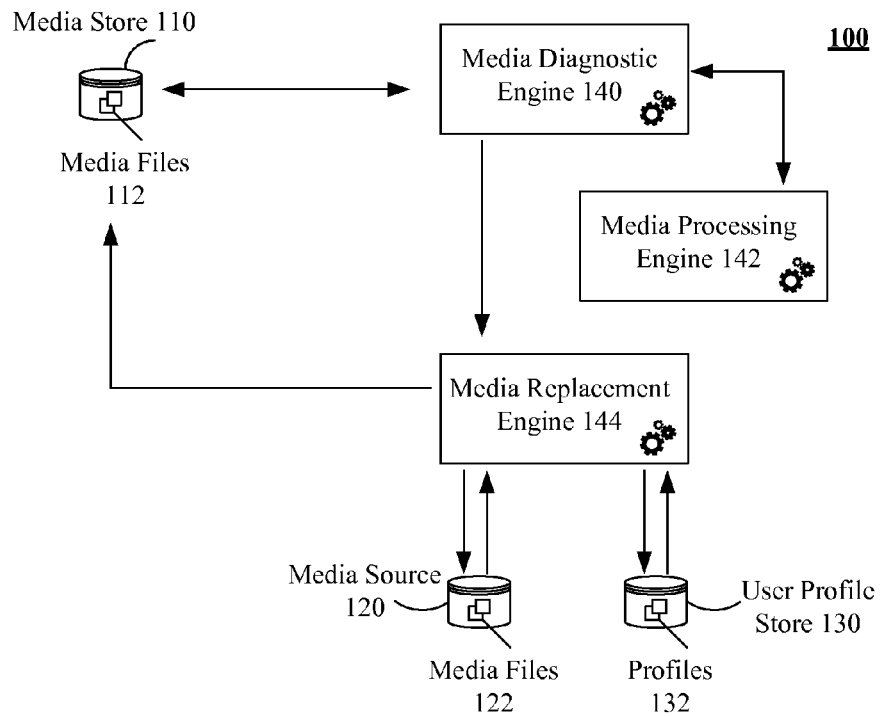
FIG. 1 is a schematic diagram of a system in which media files are diagnosed and in which files identified as having playback problems are replaced in accordance with an embodiment of the inventive arrangements disclosed herein.
Figure 1:
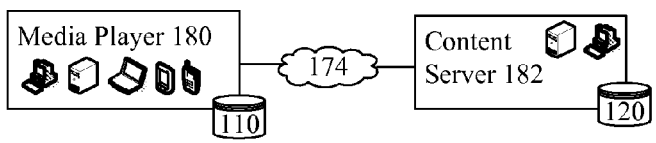
Figure 1:
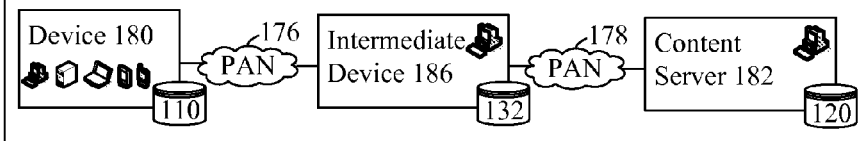

FIG. 1 is a schematic diagram of a system 100 in which media files are diagnosed and in which files identified as having playback problems are replaced in accordance with an embodiment of the inventive arrangements disclosed herein. A media diagnostic engine 140 can check media files 112 for errors, proper formatting, optimal fidelity, digital rights management (DRM) restrictions, and the like. The media diagnostic engine 140 can determine errors based upon user input and/or based upon software implemented error detection algorithms. When potential problems exist, a notification can be sent to media replacement engine 144. In one embodiment, before sending a notification to the replacement engine 144, an attempt can be made to "cure" an identified media file 112 having a problem using the media processing engine 142.

When engine 142 is unable to correct the problem and/or when a configuration lacks a processing engine 142, the media replacement engine 144 can identify a media source 120 associated with the file 112 within media history store 148. This can be a file 112 specific source 120 or a configurable set of one or more default sources, which are iteratively checked in a defined order.

The media source 120 may require authorization before media files 122 are able to be obtained. For example, a user profile store 130 can include a series of profiles 132 associated with source 120 that define which users are able to access which files 122. Acquiring one or more of the files 122 can require additional remuneration or payment. Of course, many sources 120 will provide discounted or free replacement media files 122 to users who have previously purchased a media file 122 or who have a subscription.

An example of a discounted fee can be when one format/fidelity of a media file 122 has been previously purchased and a different fidelity is desired, such as desiring a high-definition version of a movie file when a low definition file was previously purchased. Further, the media source 120 can optionally provide a discount when a limited use license for a media file 122 was previously purchased and a user now wants a less limited version of the media file 122 (e.g., "renting" a video having a single view or single day for viewing restriction and then "purchasing" the video). Contractual agreements between a user and the media source 120 can dictate a type/amount of remuneration appropriate, if any. Either way, the media replacement engine 144 can automate the acquisition process.

A copy of a media file 122 can be provided to engine 144 responsive to a request and once proper authentication is provided. This copy of a media 122 can be automatically stored in media store 110 and can replace the problematic media file 112. This replacement process can transfer any previously existing links related to the original media file 112 so that they now apply to the replacement file. For example, playlists previously referring to the original media file can be modified as necessary to refer to the replacement file.

It should be noted that the media replacement process of system 100 can be implemented in different fashions, having different expected delays. For example, in one embodiment, the entire process can occur rapidly, resulting in real-time media replacements. In another configuration, the entire process can have an average associated replacement delay of hours, days, weeks, etc. Regardless of the delay involved, system 100 makes identifying and replacing problematic media files 112 a relatively intuitive and efficient activity.

An additional option possible within system 100 is to report corrupted files to the media source 120. Conventional, media distribution sources 120 (e.g., ITUNES, RHAPSODY, NAPSTER, etc.) lack mechanisms through which problems with acquired files 112 can be reported. Here, before providing a replacement file 122, the source file 122 can be compared against the problem file 112 and/or can be diagnosed by diagnostic engine 140 to determine whether problems exist with a copy of media contained in file 122. When problems exist, and when the file 122 was originally obtained for a fee, a purchaser of the file 112 can be automatically provided with store credit or some other compensation or a provider can re-encode the file, adjust settings to permit playback, and take other responsive actions.

Active programmatic components of system 100 can be embodied in multiple different forms and can be contained in different devices. For example, in one situation 170, the media store 110 can be local to a media player 180 connected to a remotely located content server 182 associated with the media source store 120 through a network 174. Media player 180 can, for example, be a mobile phone with digital music/video playback capability where media is streamed/downloaded from content server 182 linked over a mobile telephony network 174. In another example, the content server 182 can be a desktop computer linked to a portable device 180 via a USB connection (e.g. one example of a network 174 connection) or a BLUETOOTH connection (e.g. another possible network 174 connection).

The media player 180 can be substituted with a flash memory, a portable hard-drive, or any device containing a memory store capable of containing media files 112, whether that device possesses playback capabilities or not. Similarly, the content source 182 can be a computing device having a CPU (e.g., a desktop computer, a media server, a media serving kiosk, etc.), can be a smart network device such as a smart router or media enhanced switch, or can be a storage device without internal processing capabilities (e.g., an external hard drive connected to server 182 via USB, e-SATA, FIREWIRE, etc). In situation 170, the engines 140-144 can be located exclusively within player 180, exclusively within server 182, or partially in player 180 and partially in server 182.

In a different situation 172, a media playing device 180 can be connected to an intermediate device 186, which is in turn connected to the content server 182 associated with a media store 120. The intermediate device 186 can include an intermediary data store 132, which can also contain media files.

In one arrangement, the intermediary data store 132 can be initially searched for a desired media file and the store 120 only accessed when desired media is not found in store 132. For example, media player 180 can be connected to a desktop computer 186 via a personal area network (PAN)/local port 176. The desktop 186 can be connected to a Web server or proprietary server 182 via a wide area network (WAN) 178.

In a different configuration, the intermediate device 186 and the server 182 can both be Web servers, which are interconnected in a redundant fashion for fault tolerance purposes and/or for enhanced scalability. In situation 172, the engines 140-144 can be located exclusively within device 180, exclusively within intermediary device 186, exclusively within server 182, or partially in device 180, device 186, and/or server 182. In one contemplated embodiment, applicable to situation 170 and 172, the media diagnostic, correction, and/or replacement (engines 140-144) capabilities of system 100 can be implemented as a Web service provided to users and/or media providers.

As used herein, media files 112, 122 can include digitally encoded media files, such as audio files, video files, picture files, and the like. These media files can optionally include digital rights management (DRM) restrictions and can be encoded using different encoding schemes. Exemplary types of files 112, 122 include, but are not limited to, MP3 files, Ogg Vorbis Media, MPEG-3 files, free lossless audio codec (FLAC) files, MPEG-4 files, DIVX files, XVID files, JPEG files, BMP files, and the like.

The engines 140-144 can include a set of programmatic instructions that cause a machine executing these actions to perform one or more actions. That is, the engines 140-144 can be software/firmware/hardware implemented engines. The media diagnostic engine 140 can be optionally coupled to a user interface, which permits users to identify a file as "corrupted or problematic. For example, when a user views a video file 112 and it is of poor quality, the user can make an interface selection, which indicates the file 112 is flawed. The engine 140 can also perform automated checks, such as cyclic redundancy checks, to determine whether a file 112 is corrupt.

The media processing engine 142 can perform any of a set of digital signal processing (DSP) action against the media files 112. These DSP actions can, for example, convert a media file 112 from one format, which may be unplayable on a playback device connected to store 110, to a different format, which is supported by or less likely to have compatibility issues on the playback device connected to store 110. DSP actions can also make DRM based changes, such as altering a DRM key. Another DRM based change can include altering a list of banned DRM keys and/or codecs at a server level, to change whether playback of a related media file 112 is permitted. When a media file is modified, the original unprocessed file 112 can be optionally retained since it may be fully supported by another playback device, which is able to be connected to data store 110.

Each of the data stores 110, 120, 130, 132 can be physically implemented within any type of hardware including, but not limited to, a magnetic disk, an optical disk, a semiconductor memory, a digitally encoded plastic memory, a holographic memory, or any other recording medium. Each of the data store 110, 120, 130, 136 can be stand-alone storage units as well as a storage unit formed from a plurality of physical devices, which may be remotely located from one another. Additionally, information can be stored within the data stores 110, 120, 130, 132 in a variety of manners. For example, information can be stored within a database structure or can be stored within one or more files of a file storage system, where each file may or may not be indexed for information searching purposes.

As shown herein, networks 174, 176, and/or 178 can include any hardware/software/and firmware necessary to convey digital content encoded within carrier waves. Content can be contained within analog or digital signals and conveyed through data or voice channels and can be conveyed over a personal area network (PAN) or a wide area network (WAN). The networks 174, 176, and/or 178 can each include local components and data pathways necessary for communications to be exchanged among computing device components and between integrated device components and peripheral devices. The networks 174 and 178 can also include network equipment, such as routers, data lines, hubs, and intermediary servers which together form a packet-based network, such as the Internet or an intranet. The networks 174 and 178 can further include circuit-based communication components and mobile communication components, such as telephony switches, modems, cellular communication towers, and the like. The networks 174, 176, and 178 can include line based and/or wireless communication pathways.

Figure 2:
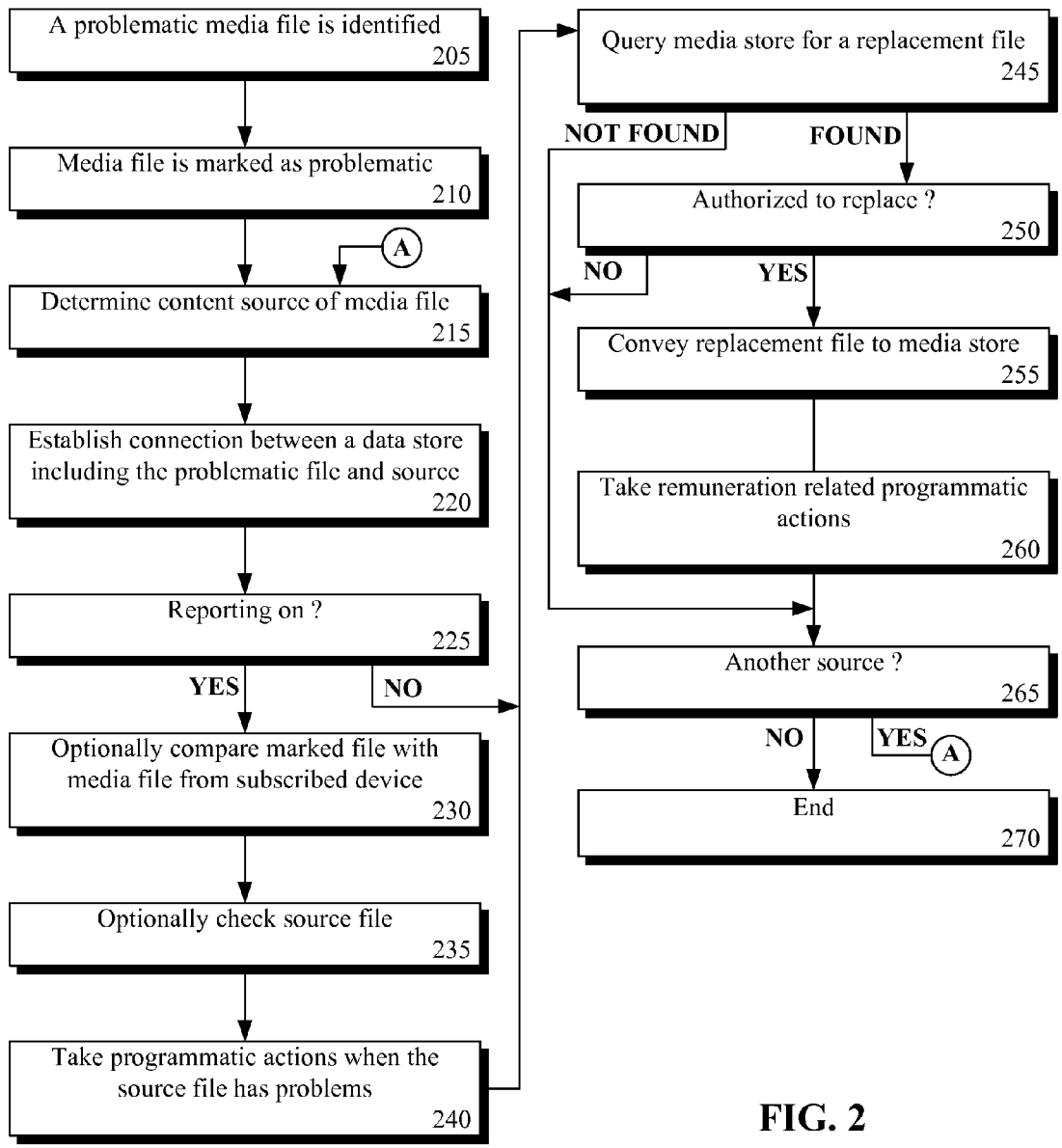
FIG. 2 is a flow chart of a method for automatically detecting and replacing media files with problems in accordance with an embodiment of the inventive arrangements disclosed herein.

FIG. 2 is a flow chart of a method 200 for automatically detecting and replacing media files with problems in accordance with an embodiment of the inventive arrangements disclosed herein. The method 200 can be performed in the context of system 100.

Method 200 can begin in step 205, where a problem is detected with a media file. The problem can be that the media file is corrupted, that the media file has audio/video problems that the media file is of a format unable to be played on a specific media player, that the media file is non-optimal for a specific media player, and the like. Problem determinations can be based upon user input and/or upon automated software-based detection algorithms. In step 210, the media file can be marked as problematic. In step 215, a possible content source for the problematic media file is determined. Multiple sources can exist for a single media file.

For example, one source can be a desktop hard drive to which a media player is connected and another source can be a Web server that provides media files to the desktop hard drive and/or the media player directly. In another example, multiple Web sources (e.g., different Web sites) can exist through which a user acquires digitally encoded songs, and these sources can be checked one-by-one whenever an original source for the problematic media file is unknown. When the content source is know, such as through metadata of the media file and/or through a database that records previous media file acquisitions, that content source can be queried for a replacement media file.

In step 220, a connection can be established between a media store containing the problematic media file and the content source. This step can occur soon after the problem was detected in step 205 or can occur after an appreciable delay. In step 225, a determination can be made as to whether an operational reporting feature is enabled. The optional reporting feature can be configured to provide feedback to the content source, which can be used to inform the content source that media files stored therein may be corrupted or problematic for the user's hardware and/or software. When an optionally equipped reporting feature is enabled, the problematic media file can be compared with a media file provided by the content source. When this comparison shows that the problematic media file is different from the provided media file, it can be assumed that the file of the content source does not have the same problem that was detected in step 205 for the local version of the media file. In one embodiment, a user reporting a problem can be notified via a message (e.g., email, IM, fax, phone, etc.) when the media source fixes the problematic file. In another embodiment, a fixed file can be automatically downloaded to the media player at a later time, such as a first time subsequent to a fix that a connection between the media player and the source occurs.

In step 235, one or more file checking algorithms can be executed to determine whether the source file has a problem. In step 240, a set of one or more programmatic actions can be taken when a problem exists with the source file. One action is to use a digital signaling processing (DSP) algorithm to fix the source file. Another action can be for the content source to automatically replace the provided media file from a secondary source. In step 245, a media store of the content source can be queried for a non-corrupt replacement file.

When a non-corrupt version of the file is not found, the method can progress from step 245 to step 265, where a different content source can be queried, if it exists. When a replacement file exists, the method can progress to step 250, where a determination can be made as to whether the requestor is entitled to receive the replacement. When not authorized, the method can progress from step 250 to step 265.

When authorized, a replacement file can be conveyed to the media store from which the programmatic file was detected, as shown by step 255. In step 260, remuneration related programmatic actions can be taken as appropriate. For example, the requester may have to pay a fee to the content source for the replacement file. In step 265, a determination can be made as to whether another source exists. If so, the method can progress from step 265 to step 215, where the next content source can be determined. If no additional content sources are to be checked, the method can end in step 270. When the method ends and a replacement file has been delivered to a media playing device, programmatic actions can be taken by the media playing device to ensure the programmatic media file is replaced by the file from the content source.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for automatically replacing problematic media files comprising:
   a first media store configured to store a plurality of digitally encoded local media files;
   a second media store configured to store a plurality of digitally encoded source media files;
   a media diagnostic engine configured to identify whether problems exist within one of the media files located in the first media store, wherein when a problem is identified, the associated file having the problem is able to be referred to as a problematic file, wherein the media diagnostic engine is configured to identify whether problems exist based upon at least one of a user input and a software based error detection algorithm determination; and
   a media replacement engine configured to replace a problematic file in the first media store with a copy of a corresponding media file from the second media store.

2. The system of claim 1, further comprising:
   a media processing engine is configured to perform at least one digital signal processing (DSP) action to modify the problematic file to remove the problem detected by the media diagnostic engine.

3. The system of claim 1, wherein the problematic file and the replacement file are both at least one of a music file and a video file.

4. The system of claim 3, wherein the problematic file is a corrupted file.

5. The system of claim 3, wherein the first media store is located within a media playing device, and wherein the second media store is a data store external to the media playing device.

6. The system of claim 5, wherein the problematic file is a file in a format incompatible with the media playing device, and wherein the replacement file is a file in a format compatible with the media playing device.

7. The system of claim 5, wherein the media diagnostic engine is stored within the media playing device and is executed by the media playing device, wherein the media playing device is at least one of a portable digital music playing device and a portable digital video playing device.

8. The system of claim 7, wherein the media replacement engine is stored within the media playing device and is executed by the media playing device.

9. The system of claim 5, wherein the second media store is a data store of a desktop computer to which the media playing device is connected via at least one of a wireless personal area network and a direct line-based connection.

10. The system of claim 9, wherein at least one of the media diagnostic engine and the media replacement engine is stored within the desktop computer and is executed by the desktop computer.

11. The system of claim 5, wherein the media playing device comprises a network transceiver, wherein the second media store is a data store of a network server to which the media playing device is directly connected via the network transceiver.

12. The system of claim 5, further comprising:
   a desktop computer to which the media playing device is connected via at least one of a wireless personal area network and a direct line-based connection, said desktop computer comprising a network transceiver, and wherein the second media store is a data store of a network server to which the desktop computer is connected via the network transceiver.

13. The system of claim 5, wherein at least one of the media diagnostic engine and the media replacement engine is stored within a network server and is executed by the network server, wherein the second media store is associated with the network server.

14. The system of claim 1, wherein the media diagnostic engine configured to identify whether problems exists based upon a user input and based upon a software based error detection algorithm determination.

15. A method for automatically replacing a media file comprising:
   within a media playing device, identifying at least one digitally encoded media file, which the media playing device is unable to play;
   connecting the media playing device to an external device associated with a media store comprising a plurality of source media files;
   querying the source media files of the media store for a corresponding one of the detected media file; and receiving a copy of the source media file resulting from the query; and replacing the identified digitally encoded media file with the received copy.

16. The method of claim 15, further comprising:

receiving a user input, wherein said user input identifies that at least one digitally encoded media file that the media player is unable to play.

17. The method of claim 15, said identifying step further comprising:

an error detection software program automatically identifying the at least one digitally encoded media file that the media player is unable to play.

18. The method of claim 15, wherein the media playing device is a portable media player, wherein the detected media file and the copy are both at least one of a music file and a video file.

19. A media playing device comprising:

a media store configured to store a plurality of digitally encoded local media files, wherein each of the media files are at least one of a music file and a video file;

media playing components configured allow the media playing device to play the digitally encoded local media files responsive to a user selection;

a port configured to permit the media playing device to exchange data with external computing devices;

a set of programmatic instructions configured to identify whether problems exist within one of the local media files, wherein an identified one of the local media files is referred to as a problematic file, wherein the problematic file is one unable to be properly played by the media playing device; and a set of programmatic instructions configured to receive a replacement file for the problematic file from one of the external computing devices and configured to replace the problematic file with the received replacement file.

20. The media playing device of claim 19, further comprising:

a user interface configured to receive user input that identifies the problematic files.

* * * * *